United States Patent [19]

Wu et al.

[11] Patent Number: 5,028,445
[45] Date of Patent: Jul. 2, 1991

[54] PROCESS OF FORMING SIMULATED CRUSTACEAN MEAT

[75] Inventors: Ming C. Wu, Irvine; Teisuke Suzuki, Whittier, both of Calif.

[73] Assignee: Jac Creative Foods, Inc., Los Angeles, Calif.

[21] Appl. No.: 348,887

[22] Filed: May 8, 1989

Related U.S. Application Data

[63] Continuation of Ser. No. 187,548, Apr. 28, 1988, abandoned.

[51] Int. Cl.$^5$ .................... A23L 1/325; A23L 1/33
[52] U.S. Cl. .................... 426/574; 426/643; 426/802
[58] Field of Search .............. 426/104, 643, 513, 518, 426/524, 802, 92, 574, 656

[56] References Cited

U.S. PATENT DOCUMENTS

| | | |
|---|---|---|
| 2,868,650 | 1/1959 | Hammerberg . |
| 3,093,483 | 6/1963 | Ishler . |
| 3,267,536 | 12/1971 | Ikeda et al. . |
| 3,358,588 | 12/1967 | Rossnan . |
| 3,532,512 | 10/1970 | Joaquin . |
| 3,615,686 | 10/1971 | Marshall . |
| 3,684,527 | 8/1972 | Walter . |
| 3,796,812 | 3/1974 | Baensch . |
| 3,829,587 | 8/1974 | Tolstoguzov et al. ............... 426/350 |
| 3,852,484 | 12/1974 | Cabot ................... 426/104 |
| 3,852,487 | 12/1974 | Van Werven et al. ............. 426/388 |
| 3,863,017 | 1/1975 | Yueh ................... 426/376 |
| 3,870,808 | 3/1975 | Boyer ................... 426/250 |
| 3,881,032 | 4/1975 | Matsumoto et al. ............... 426/643 |
| 3,891,776 | 6/1975 | Carpenter et al. .................. 426/573 |
| 3,920,853 | 11/1975 | Middendorf et al. ............... 426/104 |
| 4,084,017 | 4/1978 | Kim et al. ............... 426/656 |
| 4,158,065 | 6/1979 | Sugino ................... 426/104 |
| 4,181,749 | 1/1980 | Niki et al. ............... 426/643 |
| 4,277,513 | 7/1981 | Rufer et al. ............... 426/656 |
| 4,285,980 | 8/1981 | Lewis ................... 426/249 |
| 4,301,181 | 11/1981 | Simon et al. ............... 426/250 |
| 4,303,008 | 12/1981 | Hice et al. ............... 426/513 X |
| 4,362,752 | 12/1982 | Sugino et al. ............... 426/104 |
| 4,396,634 | 8/1983 | Shenouda et al. .................. 426/104 |
| 4,423,083 | 12/1983 | Shenouda ................... 426/574 |
| 4,464,404 | 8/1984 | Ueno et al. ............... 426/643 X |
| 4,497,844 | 2/1985 | Hice et al. ............... 426/643 |
| 4,548,823 | 10/1985 | Morimoto ................... 426/104 |
| 4,554,166 | 11/1985 | Morimoto ................... 426/276 |
| 4,557,940 | 12/1985 | Suzuki ................... 426/513 |
| 4,559,236 | 12/1985 | Okada ................... 426/643 |
| 4,579,741 | 4/1986 | Hanson et al. ............... 426/92 |
| 4,584,204 | 4/1986 | Nishimura et al. .................. 426/643 |
| 4,588,601 | 5/1986 | Maruyama et al. .................. 426/574 |
| 4,622,234 | 11/1986 | Okada ................... 426/643 |
| 4,652,455 | 3/1987 | Sugino et al. ............... 426/643 |
| 4,720,391 | 1/1988 | Kawana ................... 426/643 |

FOREIGN PATENT DOCUMENTS

| | | |
|---|---|---|
| 495353 | 1/1976 | Australia ................... 426/574 |
| 46-39059 | 11/1971 | Japan . |
| 56-38187 | 9/1981 | Japan . |
| 41469 | 3/1985 | Japan ................... 426/643 |
| 1518778 | 7/1978 | United Kingdom . |

OTHER PUBLICATIONS

Mouri et al., "Method of Forming Coating Films and Food Product Coated with Them", Jap. Pat. Abst. 57-94279, 6-11-82.
Uchida et al., "Production of Konnyaku", Jap. Pat. Abst. 61-257156, 11-14-86.

Primary Examiner—Arthur L. Corbin
Attorney, Agent, or Firm—William W. Haefliger

[57] ABSTRACT

The forming of simulated crustacean meat includes the steps of:
a) forming a mixture D of the following components:
1) surimi paste A
2) pieces B of cooked surimi paste
3) pieces C of a mixture of surimi paste, starch, protein, and konnyaku powder, the mixture having been gelled, frozen, thawed and then shredded, and
b) cooking the mixture D in a crustacean-shaped mold cavity to set.

10 Claims, 1 Drawing Sheet

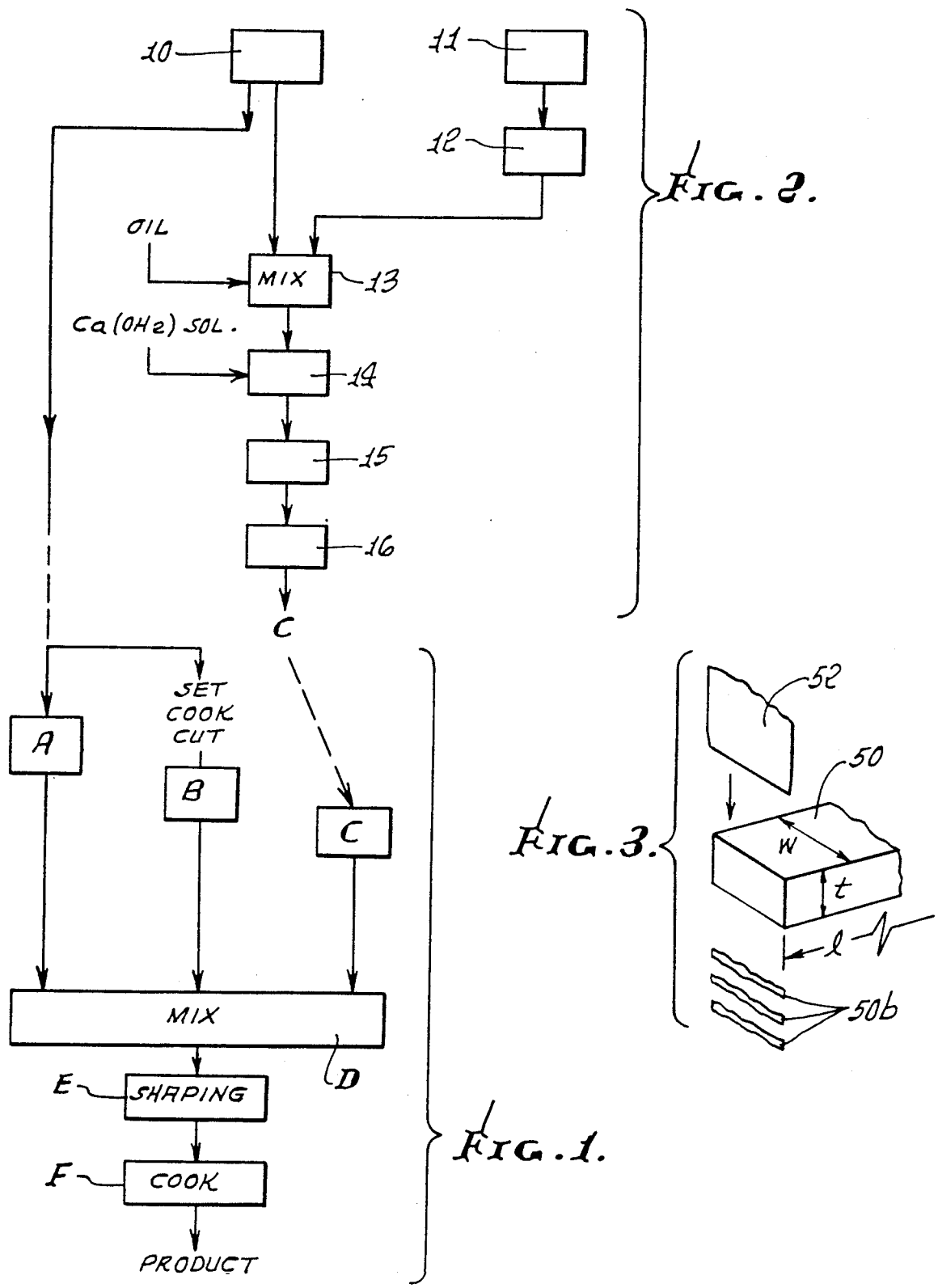

PROCESS OF FORMING SIMULATED CRUSTACEAN MEAT

This is a continuation of application No. 07/187,548 filed Apr. 28, 1988, now abandoned.

BACKGROUND OF THE INVENTION

This invention relates generally to fishmeat products, and more particularly to a method for using surimi to produce simulated meat of a crustacean, such as lobster.

In the production of simulated lobster meat it is necessary to create a sensation of fibrous crunchiness during chewing of the meat; however, this is extremely difficult, since surimi from which the product is made lacks these textured qualities. Surimi itself is defined as minced fishmeat together with additives (for example, minced Alaska pollack mixed together with 4% (by weight) sugar, 4% (by weight) sorbitol, and 13 to 0.03% (be weight) sodium tripolyphosphate). Accordingly, a need exists to achieve this desired result.

SUMMARY OF THE INVENTION

It is a major object of the invention to provide a new method for producing simulated meat of a crustacean, meeting the above need.

It is another object of the invention to provide a method for forming of simulated crustacean meat wherein a unique mixture D is achieved, containing:
1) surimi paste A (as hereinafter defined)
2) pieces B of cooked surimi paste
3) pieces C of a mixture of surimi paste, starch, other proteins, and konnyaku powder, the mixture having been gelled, frozen, then thawed, and wherein that mixture D of A, B, and C is then cooked to result in meat texturally remarkably similar to lobster meat.

It is a yet further object to provide a unique method to produce pieces C as referred to, formed after thawing, the steps typically including:
i) mixing surimi, salt, and starch, to form a first mix (i.e., paste),
ii) combining konnyaku powder with the first mix, and forming a second mix,
iii) forming a body from the second mix, and freezing same,
iv) thawing the body,
v) and shredding the thawed body to form pieces C.

Typically, such pieces C form an intricate mass or network of lamella, each less than 1 mm thick and several centimeters long, to be combined and cooked with the paste A and cooked surimi paste B, giving the ultimate product a fibrous, "crunchy" texture, as will appear.

These and other objects and advantages of the invention, as well as the details of an illustrative embodiment, will be more fully understood from the following specification and drawings, in which:

DRAWING DESCRIPTION

FIG. 1 is a flow diagram;
FIG. 2 is a flow diagram; and
FIG. 3 is a perspective view of a thawed block of a mix, to be shredded.

DETAILED DESCRIPTION

Referring first to FIG. 1, the method of forming of simulated crustacean meat includes: providing surimi paste at A; providing cooked pieces at B of surimi paste; providing pieces (as for example, thin slices) at C of a mixture of surimi paste, starch, other proteins, and konnyaku powder, the mixture having been frozen and thawed prior to formation of the pieces; and then forming at D a mixture of A, B, and C ingredients. The mixture is then shaped at E into crustacean forms (as, for example, lobster parts), as in molds, and the molds are then heated at F to cook the shaped forms. Processing as at E, F, and subsequent processing are disclosed in U.S. Pat. No. 4,720,391 for example, and incorporated herein, by reference. The purpose of providing ingredients A, B, and C, and mixing them at D is to obtain an ultimate product simulating the physical and taste properties of the crustacean, as for example, the fibrous "crunchiness" of lobster meat.

The relative proportions of A, B, and C, defined in ranges, and preferred amounts, by weight, to obtain such desirable properties, are set forth in the following table.

TABLE I

|   | Range | Preferred |
|---|-------|-----------|
| A | 30–70 | 50 |
| B | 10–50 | 30 |
| C | 10–50 | 20 |

In the above, surimi paste is obtained by pulverizing cleaned and rinsed fishmeat, as for example, Alaska pollack, and prepared as in step 10, to form the paste, which is extrudable. Crustacean flavoring is typically added to the paste. Ingredient A, in FIG. 1, may consist of such paste.

The pieces at C are formed in the following manner, with reference to FIG. 2. Step 10 comprises combining and mixing a major amount, by weight, of surimi with a small amount of salt (NaCl), a somewhat larger amount of starch and/or modified starch (wheat, corn, or potato starch, for example), a small amount of protein such as egg white powder, soy flour, whey protein, or beef blood plasma, and water, to form surimi paste. Relative amounts by weight are:

| | |
|---|---|
| surimi | 100 parts |
| salt | 1–5 parts (preferably 3 parts) |
| starch | 2–80 parts (preferably 10 parts) |
| protein | 1–10 parts (preferably 5 parts) |
| water | 10–100 parts (preferably 50 parts) |

These combined ingredients are mixed thoroughly in a "Silent" mixer (cutter rotating vertically in a receptacle which rotates about a vertical axis). In this regard, the surimi paste containing salt, as referred to, produces large actomyosin molecules.

Step 11 comprises combining and mixing the following: 1000 parts by weight of water with 40 parts by weight of konnyaku powder, and mixing them for 60 seconds. (Konnyaku powder or flour, also known as konjaku flour or yam flour, derives from the mechanical processing of the tubers of Amorphophallus rivieri Dur). The solution is allowed to set for 30 minutes. To this solution are added, at step 12, the following parts, by weight:

|  | Range | Preferred |
| --- | --- | --- |
| water | 50-500 | 200 |
| starch (as above) | 10-150 | 70 |
| protein | 0-20 | 5 |

In the above, the protein may consist of egg white, or soy flour, or whey, or beef blood plasma, or combinations thereof. This mixture is mixed together for about 5 minutes.

The two mixes at 10 and 12 are then combined as at 13, and mixed together. About 10 weight parts vegetable oil is added to retard gel formation when $CaOH_2$ solution is subsequently added, at 14, to enable pumping, extruding, or forming into block shape at 15.

As described, an aqueous solution of calcium hydroxide is formed (as by combining 100 parts water and 2.5 parts $CaOH_2$), and this base solution is combined at 14 with the mix produced at 13. This combination is mixed together for about 2 minutes, to form a pumpable paste. The paste is pumped, extruded, or otherwise formed at 15, under pressure, into a block, seen at 50 in FIG. 3, with high relative surface area. For example, its width "w" is about 3 times its thickness "t", and its length "l" is at least 5 times its width. Typical dimensions are:

w≈4 inches t≈1.5 inches l≈30 inches

That block 50 is then quick-frozen, at 16, as in a liquid $CO_2$ tunnel or enclosure, at about $-80°$ F., for example. The freezing is sufficiently rapid so as not to form layers of crystals in the block, i.e., to keep the block composition homogeneous. Freezing time is between 10 and 90 minutes.

The block is then thoroughly thawed, so as to be easily shredded, it being found that the shape of the block is maintained, as by the orientation of the remanent thawed structure, but is easily and quickly shreddable into thin pieces such as elongated shreds, seen at 50b. The length of the shreds corresponds generally to the width "w" of the block, or a substantial fraction of such width (for example, 2-4 centimeters), and the thickness of the shreds is less than 1 mm. A reciprocated knife 52 easily cuts through the block, widthwise. The width of the shreds is about 1 cm. Thawing of the block ensures integrity of each shred 50b during cutting, and facilitates same.

The pieces or shreds 50b are then water-washed and compressed, to remove water, at step 16. The resultant dehydrated shreds are employed at C, in FIG. 1.

Ingredient B in FIG. 1 is formed as by setting surimi paste (as referred to above) for 1 to 24 hours, at 4° C. to 45° C., to form a fibrous gel, as in a body such as a block, and then cooked for 30 to 60 minutes at 80° C. to 95° C. That body is then cut into fibrous pieces or shreds, of about the same sizes as shreds 50b. Accordingly, the mix at D includes two different types of shreds, i.e., those at B and C, and formed as described, and with the result that the product, after shaping and further cooking at F, has the described characteristics of crustacean meat, such as lobster.

Color may be added to the crustacean (lobster) pieces, as required.

I claim:

1. A process of forming simulated crustacean meat, consisting essentially of
    a) forming a mixture D, of the following components:
        1) surimi paste A
        2) pieces B of cooked surimi paste
        3) pieces C of a mixture of surimi paste, starch, protein, and konnyaku powder, the mixture having been gelled, frozen, thawed and then shredded,
    b) and, directly after said forming, cooking the mixture D in a crustacean-shaped mold cavity to set said mixture D,
    c) said pieces C, being formed by
        i) mixing surimi, salt, starch and water to form a first mix,
        ii) combining an aqueous mix of konnyaku powder, starch, and protein with the first mix, and forming a second mix therefrom,
        iii) forming a body from the second mix, and quick freezing same to present formation of layers of crystals in the body,
        iv) thawing the body,
        v) and shredding the thawed body to form pieces C in the form of a mass of lamella each having
            length between 2 and 4 cm
            width below 1 cm
            thickness under 1 mm.

2. The method of claim 1 wherein the proportions, by weight, of A, B, and C in mixture D are as follows:
    A = 30-70 parts
    B = 10-50 parts
    C = 10-50 parts.

3. The method of claim 1 wherein the proportions, by weight, of A, B, and C in mixture D are about as follows:
    A about 50
    B about 30
    C about 20.

4. The method of claim 1 wherein the konnyaku powder in c), ii) is preliminarily mixed with water and allowed to set, and then is combined with the protein and starch to form a sub-mix, said sub-mix then being added to the first mix to form said second mix.

5. The method of claim 1 wherein the relative proportions, by weight, of the first mix are:

| surimi | 100 parts |
| --- | --- |
| salt (NaCl) | 1-5 parts |
| starch | 2-10 parts |
| water | 10-100 parts. |

6. The method of claim 5 including adding about 10 parts edible oil t the second mix, prior to said forming of the body, under pressure exerted on the second mix to displace same.

7. The method of claim 1 including adding an edible oil to the second mix, prior to said forming of the body, under pressure exerted on the second mix to displace same.

8. The method of claim 1 wherein said freezing is carried out rapidly at about $-80°$ F. to avoid formation of crystal layers in the body.

9. The method of claim 1 wherein said step c) ii) is carried out by;
    mixing konnyaku powder and water, and allowing the resultant mix to set for about 30 minutes, and then combining protein and starch with said resultant mix and mixing same with the first mix to form said second mix.

10. The method of claim 1 wherein said pieces B of cooked surimi paste are formed by setting surimi paste at between about 4° C. and 45° C. to form a fibrous gel, heating the gel to form a resultant body, and then cutting or shredding said body to form said pieces B.

* * * * *